United States Patent [19]

Allen et al.

[11] Patent Number: 5,728,205
[45] Date of Patent: Mar. 17, 1998

[54] PROCESS FOR THE ADDITION OF BORON IN A TIO₂ MANUFACTURING PROCESS

[75] Inventors: Alvin Allen, Claymont, Del.; John Steven Gergely, Avondale, Pa.

[73] Assignee: E. I. du Pont de Nemours and Company, Wilmington, Del.

[21] Appl. No.: 764,414

[22] Filed: Dec. 11, 1996

[51] Int. Cl.⁶ ................................................. C09C 1/36
[52] U.S. Cl. .................... 106/437; 106/442; 106/444; 106/446; 423/613; 423/592
[58] Field of Search ................................ 106/436, 437, 106/442, 444, 446; 423/592, 593, 612, 613

[56] References Cited

U.S. PATENT DOCUMENTS

| 2,512,079 | 6/1950 | Werner | 23/202 |
|---|---|---|---|
| 3,433,594 | 3/1969 | Wilson et al. | 23/202 |
| 3,443,897 | 5/1969 | Wilson et al. | 23/202 |
| 3,642,442 | 2/1972 | Hoekje et al. | 23/202 |
| 4,781,761 | 11/1988 | Jacobson | 106/446 |
| 5,562,764 | 10/1996 | Gonzales | 106/437 |

FOREIGN PATENT DOCUMENTS

| 1 069 071 | 5/1967 | United Kingdom | C01G 1/02 |
|---|---|---|---|
| WO 96/00699 WO | 1/1996 | WIPO | C01G 23/07 |
| 96/06803A1 | 3/1996 | WIPO | C01G 23/07 |
| WO 96/36441 | 11/1996 | WIPO | B05D 7/00 |

OTHER PUBLICATIONS

M. Kamal Akhtar, Sotiris E. Pratsinis, Sebastian V. R. Mastrangelo, "Dopants in Vapor–Phase Synthesis of Titania Powders", *Journal of the American Ceramic Society*, 75, No. 12, 3408–3416, Dec. 1992.

*Primary Examiner*—Michael Marcheschi

[57] ABSTRACT

The present invention provides a process for producing titanium dioxide ($TiO_2$) pigment comprising boron oxide ($B_2O_3$), comprising the steps of: (a) reacting titanium tetrachloride ($TiCl_4$) in the vapor phase with an aluminum compound and an oxygen-containing gas in a reactor at a temperature in the range of about 900° C. to about 1600° C. to provide a gaseous suspension comprising $TiO_2$ particles, and (b) contacting the gaseous suspension comprising the $TiO_2$ particles with a boron compound to produce $TiO_2$ pigment comprising $B_2O_3$.

23 Claims, No Drawings

PROCESS FOR THE ADDITION OF BORON IN A TIO₂ MANUFACTURING PROCESS

BACKGROUND OF THE INVENTION

1. Field of the Invention

The present invention relates to a process for the production of titanium dioxide ($TiO_2$) pigment comprising boron oxide ($B_2O_3$), wherein a boron compound is added and more particularly wherein the boron compound is added to the process downstream of where an oxygen-containing gas and titanium tetrachloride ($TiCl_4$) are initially contacted.

2. Description of the Related Art

The process for producing $TiO_2$ pigment by reacting an oxygen-containing gas and $TiCl_4$ at temperatures ranging from 900° C. to 1600° C. in the vapor phase is known. The resulting hot gaseous suspension of $TiO_2$ particles and free chlorine are discharged from the reactor and must be quickly cooled below 600° C. within about 5 to 100 milliseconds. This cooling is accomplished in a conduit, i.e., a flue, so that undesired $TiO_2$ particle size growth is prevented and particle agglomeration is minimized. Particle size and particle agglomeration are important $TiO_2$ properties.

The particle size of the $TiO_2$ pigment is measured in terms of carbon black undertone (CBU). Pigments containing smaller-sized particles have a relatively high CBU, and finished products (e.g., paints, plastics, etc.) containing such pigments tend to have a bluish tint. Pigments with larger-sized particles have a relatively low CBU and finished products containing such pigments tend to have a more yellowish tint. The particle agglomeration of the pigment is typically measured in terms of its particle size distribution (coarse fraction). Pigments, wherein a low weight percentage of the particles (e.g., less than 30% as measured by a SEDIGRAPH® instrument) have a particle diameter size greater than 0.6 microns, tend to have low particle agglomeration and finished products made with such pigments tend to have high gloss. Pigments, wherein a high weight percentage of the particles have a particle size diameter greater than 0.6 microns, tend to have greater particle agglomeration and finished products made with such pigments tend to have lower gloss.

If extensive agglomeration of $TiO_2$ results, the $TiO_2$ must be milled or ground in an energy intensive, expensive process such as fluid-energy milling to reduce the size of agglomerates in order to achieve the desired pigment properties. Particle agglomeration can limit product quality and/ or rate of throughput.

In the chloride vapor phase process for producing $TiO_2$, two crystal structures of $TiO_2$ may form: rutile and anatase. Rutile $TiO_2$ is preferred for its higher durability and its higher refractive index, both of which are important performance characteristics. Anatase $TiO_2$ is more photoactive than rutile $TiO_2$ and possesses a lower refractive index. The presence of the anatase phase will in particular adversely affect durability. Even low levels of anatase affect the durability of a finished $TiO_2$ pigment.

In paper and other applications such as delustering of textiles, where abrasion is an important consideration, anatase $TiO_2$ pigments are preferred due to their lower abrasion properties. Rutile $TiO_2$ pigments tend to cause excessive wear of spinnerets, thread guides and needles used in high-speed spinning and fabricating processes. One possible explanation for the high abrasion properties of rutile $TiO_2$ pigments is the multiple facets of the pigment particles.

Particle size has been controlled previously, for example, by pre-mixing volatile silicon compounds and $TiCl_4$ prior to reacting it with the oxygen-containing gas. However, such processes have a tendency to form some anatase $TiO_2$ pigment.

Gonzalez, U.S. Pat. No. 5,562,764 discloses an improvement in these processes by adding the volatile silicon compound downstream of where the oxygen-containing gas and $TiCl_4$ are initially contacted to produce a substantially anatase-free $TiO_2$ pigment. However, the process in Gonzalez, U.S. Pat. No. 5,562,764 does not provide many of the advantages recognized by the process of the present invention as described in greater detail below.

Werner, U.S. Pat. No. 2,512,079 describes treatment of $TiO_2$ pigment product with boric acid to reduce the acidity of the $TiO_2$ and to impart fineness and softness. An oxygen compound of boron is added to the $TiO_2$ to remove chlorine-containing compounds from the $TiO_2$ product's surface. In this process, the boron is added to the $TiO_2$ product after the product has been separated from the gas and collected as a solid product.

Wilson et al., U.S. Pat. No. 3,443,897 and Hoekje et al., U.S. Pat. No. 3,642,442 describe a process to prepare $TiO_2$ by vapor phase oxidation of $TiCl_4$ wherein heat is supplied to the reaction zone by means of an electric arc or radio frequency induction heater. Nucleation agents for the $TiO_2$ are generated from one or more electrodes of a plasma arc. At least one of the electrodes contains a metal which is introduced into the gas atmosphere or stream and forms a white metal oxide upon oxidation to serve as a nucleating agent. Boron is included in a list of metals which form a white oxide. Preferred metals are aluminum, silicon, zirconium and titanium.

Jacobson, U.S. Pat. No. 4,781,761 describes a wet-treatment process for coating $TiO_2$ pigment particles with dense silica coatings, wherein the silica is co-deposited with $B_2O_3$.

Akhtar, Pratsinis and Mastrangelo disclose in "Dopants In Vapor-Phase Synthesis of Titania Powders", *J. Am. Ceram. Soc.* 1992, 75(12), 3408–16, the addition of $BCl_3$ as a dopant in a process to prepare $TiO_2$. $BCl_3$ is pre-mixed with $TiCl_4$ prior to introduction into a reaction vessel, wherein $TiCl_4$ is contacted with oxygen. The addition of $BCl_3$ produced primarily anatase powders and decreased the rutile phase content. As discussed above, while it is known in the art that boron compounds can be used as a nucleant for the production of $TiO_2$ pigment and in the coating process of $TiO_2$ pigments, there is still a need for a process to produce $TiO_2$ pigment having improved quality with decreased particle size and decreased agglomeration (improved particle size control).

There is also a need to provide rutile $TiO_2$ pigment which is less abrasive. However, it is also important that any additive or change to the $TiCl_4$ oxidation process does not cause the formation of detectable anatase nor in any other way negatively impact the durability of the $TiO_2$ pigment.

Further, there is a need for a process to provide pigmentary $TiO_2$ which reduces or eliminates the use of scrubs in order to achieve reduced costs and complexity of the $TiO_2$ manufacturing process.

The present invention meets the foregoing needs.

SUMMARY OF THE INVENTION

The present invention provides a process for producing titanium dioxide pigment comprising $B_2O_3$, comprising the steps of:(a) reacting $TiCl_4$ in the vapor phase with an aluminum compound and an oxygen-containing gas in a reactor at a temperature in the range of about 900° C. to about 1600° C. to provide a gaseous suspension comprising $TiO_2$ particles, and (b) contacting the gaseous suspension comprising the $TiO_2$ particles with a boron compound to produce $TiO_2$ pigment comprising $B_2O_3$.

The resulting $TiO_2$ pigment is in substantially rutile form. Preferably, the aluminum compound is an aluminum halide selected from the group consisting of $AlCl_3$, $AlBr_3$, $AlI_3$, and mixtures thereof and more preferably, the aluminum halide is $AlCl_3$. The $AlCl_3$ may be added in an amount sufficient to provide about 0.5 to about 10% by weight of $Al_2O_3$ based total weight of $TiO_2$ solids formed in the oxidation reaction.

Preferably, the boron compound is a boron halide selected from the group consisting of $BCl_3$, $BBr_3$, $BI_3$, and mixtures thereof and more preferably, the boron halide is $BCl_3$. The $BCl_3$ may be added in an amount sufficient to provide about 500 ppm to about 5000 ppm boron based on total weight of $TiO_2$ solids formed in the oxidation reaction. Preferably, the $BCl_3$ is added in an amount sufficient to provide about 800 ppm to about 2000 ppm boron based on total weight of $TiO_2$ solids formed in the oxidation reaction. In alternative embodiments, the boron compound is boric acid.

Preferably, the temperature of the gaseous suspension of $TiO_2$ particles at the point where the particles are contacted with a boron compound is in the range of about 1000° C. to about 1600° C. and the pressure is in the range of about 40 to about 60 psig.

This invention also provides a process for producing titanium dioxide pigment comprising $B_2O_3$, comprising the steps of: (a) reacting $TiCl_4$ in the vapor phase with an aluminum compound and an oxygen-containing gas in a reactor at a temperature in the range of about 900° C. to about 1600° C. to provide a gaseous suspension comprising $TiO_2$ particles, and (b) passing the gaseous suspension comprising $TiO_2$ particles to a cooling conduit, and (c) contacting the gaseous suspension in the cooling conduit with a boron compound to produce $TiO_2$ pigment comprising $B_2O_3$.

Scouring particles may be introduced into the cooling conduit but are not necessary. In the above embodiment which involves passing the gaseous suspension to a cooling conduit, the resulting $TiO_2$ pigment is also in substantially rutile form. Preferably, the aluminum compound is an aluminum halide selected from the group consisting of $AlCl_3$, $AlBr_3$, $AlI_3$, and mixtures thereof and more preferably, the aluminum halide is AlCl3. Preferably, the boron compound is a boron halide which is introduced into the conduit at the point where the scouring particles are introduced into the conduit. Preferably, the boron halide is selected from the group consisting of $BCl_3$, $BBr_3$, $BI_3$, and mixtures thereof, and the scouring particles are selected from the group consisting of calcined $TiO_2$, NaCl, KCl, sand, and mixtures thereof. In alternative embodiments, the boron compound is boric acid which may be introduced into the conduit at the point where the scouring particles are introduced into the conduit.

The cooled $TiO_2$ pigment comprising $B_2O_3$ may be recovered and subjected to finishing and grinding steps such as being surface-treated with a coating comprising silica and fluid-energy milled.

DETAILED DESCRIPTION OF THE INVENTION

The present invention provides a process for producing titanium dioxide ($TiO_2$) pigment comprising boron oxide ($B_2O_3$). The resulting $TiO_2$ pigment is in substantially rutile form.

The process of the present invention involves reacting titanium tetrachloride ($TiCl_4$) in the vapor phase with an aluminum compound and an oxygen-containing gas in a reactor at a temperature in the range of about 900° C. to about 1600° C. to provide a gaseous suspension comprising $TiO_2$ particles, and contacting the gaseous suspension comprising $TiO_2$ particles with a boron compound that will form $B_2O_3$. This process is described in greater detail below.

The production of $TiO_2$ pigment by the vapor phase oxidation of a titanium tetrahalide, particularly $TiCl_4$, is well known and disclosed in Schaumann, U.S. Pat. No. 2,488,439 and Krchma et al., U.S. Pat. No. 2,559,638, the disclosures of which are hereby incorporated by reference. In the production of $TiO_2$ pigment by the vapor phase oxidation of titanium tetrahalides, titanium tetrachloride ($TiCl_4$), titanium tetrabromide ($TiBr_4$), and/or titanium tetraiodide ($TiI_4$) may be used, but it is preferable to use $TiCl_4$. First, $TiCl_4$ is evaporated and preheated to temperatures of from about 300° C. to about 650° C. and introduced into a reaction zone of a reaction vessel. Aluminum compounds in amounts sufficient to provide about 0.5% to about 10% $Al_2O_3$, preferably about 0.5% to about 5%, and more preferably about 0.5% to about 2% $Al_2O_3$ by weight based on total weight of $TiO_2$ solids formed in the oxidation reaction are thoroughly mixed with the $TiCl_4$ prior to its introduction into the reaction zone of the reaction vessel. Suitable aluminum compounds include, for example, $AlCl_3$, $AlBr_3$ and/or $AlI_3$. Preferably, $AlCl_3$, as disclosed in U.S. Pat. No. 2,559,638, is used in the process of the present invention. The $AlCl_3$ is thoroughly mixed with $TiCl_4$ prior to its introduction into the reaction zone of the reaction vessel. In alternative embodiments, the aluminum halide may be added partially or completely downstream with the boron compound.

The oxygen-containing gas is preheated to at least 1200° C. and is continuously introduced into the reaction zone through a separate inlet from an inlet for the $TiCl_4$ feed stream. By "reaction zone", it is meant the length of the reactor in which substantial reaction of the reactants takes place. The reaction of $O_2$ and $TiCl_4$ in the vapor phase is extremely fast and provides a hot gaseous suspension comprising $TiO_2$ particles and free chlorine. This reaction step is followed by a brief period of $TiO_2$ particle growth. Optionally, the oxygen-containing gas contains a nucleant. By "nucleant", it is meant any substance which can reduce the particle size of the pigment such as metals, oxides, salts or other compounds of sodium, potassium, lithium, rubidium, cesium, calcium, barium, strontium, and the like or mixtures thereof as disclosed in Lewis et al., U.S. Pat. No. 3,208,866 and Allen et al., U.S. Pat. No. 5,201,949. Particularly preferred nucleants are CsCl and KCl. The pressure for carrying out the oxidation process is preferably at least 20 psig as described in Santos, U.S. Pat. No. 3,505,091.

The hot gaseous suspension comprising the $TiO_2$ particles is then rapidly cooled in order to prevent undesirable particle size growth. Cooling of the hot gaseous suspension may be performed by methods known in the art. These methods typically involve passing the hot gaseous suspension through a cooling conduit (flue) having relatively cool walls in comparison to the gaseous suspension. Granular scouring particles (scrubs), such as calcined $TiO_2$, NaCl, KCl, sand, and mixtures thereof, may be added to the flue to reduce the formation of $TiO_2$ particulate deposits on the internal walls of the flue. This cooling step is described in greater detail in Rick, U.S. Pat. No. 2,721,626, Nerlinger, U.S. Pat. No. 3,511,308 and Rahn et al., U.S. Pat. No. 3,475,258, the disclosures of which are hereby incorporated by reference.

In carrying out the invention, the boron compound is added downstream from the $TiCl_4$ stream addition. The exact point of boron compound addition will depend on the reactor design, flow rate, temperatures, pressures and production rates. For example, the boron compound may be added at one or more points downstream from where the TiCl$_4$ and oxygen-containing gas are initially contacted. Specifically, the temperature of the reaction mass at the point or points of boron compound addition will range from about 500° C. to about 1600° C., preferably about 1000° C. to about 1600° C., at a pressure of about 5–100 psig, preferably 15–70 psig and more preferably 40–60 psig. It will be understood by those skilled in the art that the temperature profile in the reactor will guide the choice of the appropriate addition points for the boron compound.

Suitable boron compounds include, for example, boron halides (e.g., BCl$_3$, BBr$_3$, and BI$_3$, preferably BCl$_3$), volatile boron organic compounds (e.g., trimethylborate, boron hydrides), and low melting-point boron compounds (e.g., boric acid). In general, boron compounds which can be converted into a fluid boron oxide at process temperatures are suitable. Preferably, boron chloride is used.

In one embodiment, BCl$_3$ is added downstream in the flue where the scrubs are added to minimize the build-up of TiO$_2$ in the interior of the flue as described above. In this embodiment, the BCl$_3$ can be added downstream alone or at the same point where the scrubs are introduced into the flue. However, it should be recognized that in the practice of the present invention, the addition of scrubs is optional.

The boron compound becomes incorporated on the surface of the TiO$_2$ particles as boron oxide (B$_2$O$_3$). Often, the boron compound is added in an amount sufficient to provide from about 500 ppm to about 5000 ppm boron as B, preferably from about 800 ppm to about 2000 ppm boron as B by weight based on total weight of TiO$_2$ solids formed in the oxidation reaction.

As a result of mixing of the reactant streams, substantially complete oxidation of TiCl$_4$, AlCl$_3$ and BCl$_3$ takes place but for conversion limitations imposed by temperature and thermochemical equilibrium. Solid particles of TiO$_2$ form. The reaction product containing a suspension of TiO$_2$ particles in a mixture of chlorine and residual gases is carried from the reaction zone at temperatures considerably in excess of 1200° C. and is subjected to fast cooling in the flue as described above or other conventional means.

The TiO$_2$ pigment is recovered from the cooled reaction products by conventional separation treatments, including cyclonic or electrostatic separating media, filtration through porous media or the like. The recovered TiO$_2$ pigment may be subjected to surface-treatment, milling, grinding or disintegration treatment to obtain the desired level of agglomeration. For example, surface-treatment of the TiO$_2$ particles may comprise treating the particles with a coating comprising silica.

In general, the process of the present invention provides several advantages including the following:

(1) a reduction in coarse fraction of TiO$_2$ particles (weight percentage of TiO$_2$ particles having a diameter size greater than 0.6 microns);

(2) faster cooling rates;

(3) the amount of scrubs in the flue may be reduced; and (4) TiO$_2$ pigment having an undetectable amount of anatase (100% rutile within limits of detection).

The present invention is further illustrated by the following examples using the following test methods, but these examples should not be construed as limiting the scope of the invention.

Test Methods

Particle Size Distribution (SEDIGRAPH® Instrument)

Particle size distribution of the TiO$_2$ pigment products was measured by sedimentation analysis, with a SEDIGRAPH® (Micromeritics Instrument Corp., Norcross, Ga.) after dispersion in aqueous suspension by fixed level sonication. The particle size measurement of the oxidation base and the %>0.6 microns fraction will indicate the potential for peak gloss in the finished product, a value that cannot be exceeded while applying any reasonable energy level.

Particle Size Distribution (Horiba Instrument)

Particle size distribution of the TiO$_2$ pigment was measured using Mie scattering theory to measure "equivalent spherical diameter" as a function of percent transmittance and scattered light using a Horiba LA-900 (Horiba Instruments, Inc. Irvine, Calif.) after dispersion in aqueous suspension by fixed level sonication. The particle size of the TiO$_2$ pigments is represented as the cumulative mass percent greater than 0.6 microns, or %>0.6 microns.

Boron Content

Boron content was measured by inductively coupled plasma analysis with an Optima-3000 Penkin-Elmer, Norwalk, Conn.

Carbon Black Undertone

The carbon black undertone (CBU) of a TiO$_2$ pigment sample was measured according to the methods described in Schaumann, U.S. Pat. Nos. 2,488,439 and 2,488,440, the disclosures of which are hereby incorporated by reference, using a benchmark value of 10 rather than 100 as used in the patents. The CBU was measured by mulling together a suitable liquid, such as light colored oil, the TiO$_2$ pigment sample, and carbon black. The mixture was spread on a panel and the relative blueness of the gray mixture was observed. Pigments containing smaller-sized particles have a relatively high CBU and a bluer undertone. Pigments with larger-sized particles have a relatively low CBU and a more yellowish undertone.

Einlehner Abrasion

This method for measuring the abrasion properties of TiO$_2$ pigment uses an Einlehner Abrasion Tester Model AT 1000 with a phosphorbronze test screen supplied by Hans Einlehner, Inc.

EXAMPLES

Comparative Example A

TiCl$_4$ was thoroughly premixed with sufficient AlCl$_3$ to provide 1% by weight Al$_2$O$_3$ based on total solids formed in the oxidation reaction. The TiCl$_4$ was evaporated, preheated, and introduced into a reaction zone. Simultaneously, preheated oxygen was continuously introduced through a separate inlet to the reaction zone. Trace amounts of KCl dissolved in water were added to the oxygen stream as disclosed in Lewis et al., U.S. Pat. No. 3,208,866. The reactant streams were rapidly mixed. The gaseous suspension of titanium dioxide pigment formed in the reactor was discharged to a cooling conduit (flue) and quickly cooled. NaCl scrubs were introduced into the gaseous suspension at the front end of the conduit as the suspension was discharged from the reactor as disclosed in Nerlinger, U.S. Pat. No. 3,511,308, in an amount of about 5% based on the total solids in the conduit. A reaction temperature was measured at a point downstream of the point at which TiCl$_4$ and oxygen were initially contacted. The TiO$_2$ pigment was separated from the cooled gaseous products by conventional means. The properties of the resulting TiO$_2$ pigment are listed below in Table 1.

Example 1

The process of Comparative Example A was repeated except that $BCl_3$, in the amount of 3000 ppm by weight boron as B, based on the weight of the $TiO_2$ produced in the oxidation reaction, was fed to the reactor as a finely dispersed liquid at a location about 3.5 ft downstream from the point at which the $TiCl_4$ and oxygen were initially contacted. One further difference in this Example 1 from Comparative Example A was that no NaCl scrubs were added in Example 1 because of the pronounced cooling that occurred. At the same point as in Comparative Example A, downstream of the point at which $TiCl_4$ and oxygen were initially contacted, a reaction temperature was measured. Reaction temperature in Example 1 was 188° C. cooler than at the same point in the process as Comparative Example A. The properties of the resulting $TiO_2$ pigment are shown below in Table 1.

TABLE 1

| | Examples | | | |
|---|---|---|---|---|
| Property | A | 1 | 2 | 3 |
| Coarse Fraction(a) | 48.9% | 27.3% | 32.5% | 41.6% |
| Coarse Fraction (b) | 26.4% | 19.7% | 22.5% | 21.85% |
| CBU | 12.5 | 14.1 | 13.3 | 13.3 |
| Abrasion | 23 mg | 15.4 mg | 16.5 mg | 16.4 mg |
| *% Rutile | >99.8 | >99.8 | >99.8 | >99.8 |
| **PPM Boron | 1.5 | 1620 | 1070 | 1185 |

Coarse Fraction(a) - coarse fraction as measured by the Horiba LA-900
Coarse Fraction (b) - coarse fraction as measured by the SEDIGRAPH ® :
*% Rutile - the % of rutile phase was determined by x-ray defraction.
**PPM Boron - In Comparative Example A, some boron is evident in the resulting $TiO_2$ pigment due to a trace amount being present in the process.

Example 2

The process of Example 1 was repeated except $BCl_3$, in the amount of 2000 ppm by weight boron as B, based on the weight of the $TiO_2$ solids formed in the oxidation reaction, was fed to the reactor as a finely dispersed liquid at a location about 3.5 ft. downstream from the point at which the $TiCl_4$, $O_2$ and $AlCl_3$ were initially contacted. Similarly to Example 1, no scrubs were added in this Example 2 due to the pronounced cooling which occurred. Reaction temperature in this Example 2 was 179° C. cooler than at the same point in the process as Comparative A. The properties of the resulting $TiO_2$ pigments are shown above in Table 1.

Example 3

The process of Example 2 was repeated with $BCl_3$, in the amount of 2000 ppm by weight boron as B, based on the weight of the $TiO_2$ solids formed in the oxidation reaction, being fed to the reactor as a finely dispersed liquid at a location about 3.5 ft. downstream from the point at which the $TiCl_4$, $O_2$ and $AlCl_3$ were initially contacted. NaCl scrubs were introduced into the gaseous suspension at the front end of the conduit as the suspension was discharged from the reactor in an amount of about 5% based on the total solids in the conduit in a manner similar to Comparative Example A. Reaction temperature in this Example 3 was 186° C. cooler than at the same point in the process as Comparative A. The properties of the resulting $TiO_2$ pigments are shown above in Table 1.

We claim:

1. A process for producing titanium dioxide pigment comprising $B_2O_3$, comprising the steps of:
   (a) reacting vaporous $TiCl_4$ with an aluminum compound and an oxygen-containing gas in a reactor at a temperature in the range of about 900° C. to about 1600° C. to provide a gaseous suspension comprising $TiO_2$ particles, and
   (b) contacting the gaseous suspension comprising the $TiO_2$ particles with a boron compound to produce $TiO_2$ pigment comprising $B_2O_3$.

2. The process of claim 1, wherein the $TiO_2$ pigment is in substantially rutile form.

3. The process of claim 1, wherein the aluminum compound is an aluminum halide selected from the group consisting of $AlCl_3$, $AlBr_3$, $AlI_3$, and mixtures thereof.

4. The process of claim 3, wherein the aluminum halide is $AlCl_3$.

5. The process of claim 4, wherein the $AlCl_3$ is added in an amount sufficient to provide about 0.5 to about 10% by weight of $Al_2O_3$ based on total weight of $TiO_2$ solids formed in the oxidation reaction.

6. The process of claim 1, wherein the boron compound is a boron halide selected from the group consisting of $BCl_3$, $BBr_3$, $BI_3$, and mixtures thereof.

7. The process of claim 6, wherein the boron halide is $BCl_3$.

8. The process of claim 7, wherein the $BCl_3$ is added in an amount sufficient to provide about 500 ppm to about 5000 ppm boron based on total weight of $TiO_2$ solids.

9. The process of claim 8, wherein the $BCl_3$ is added in an amount sufficient to provide about 800 ppm to about 2000 ppm boron based on total weight of $TiO_2$ solids.

10. The process of claim 1, wherein the boron compound is boric acid.

11. The process of claim 1, wherein the temperature of the gaseous suspension of $TiO_2$ particles at the point where the particles are contacted with a boron compound is in the range of about 1000° C. to about 1600° C. and the pressure is in the range of about 40 to about 60 psig.

12. A process for producing titanium dioxide pigment comprising $B_2O_3$, comprising the steps of:
   (a) reacting vaporous $TiCl_4$ with an aluminum compound and an oxygen-containing gas in a reactor at a temperature in the range of about 900° C. to about 1600° C. to provide a gaseous suspension comprising $TiO_2$ particles, and
   (b) passing the gaseous suspension comprising $TiO_2$ particles to a cooling conduit, and
   (c) contacting the gaseous suspension comprising $TiO_2$ particles in the cooling conduit with a boron compound to produce $TiO_2$ pigment comprising $B_2O_3$.

13. The process of claim 12, wherein scouring particles are introduced into the cooling conduit.

14. The process of claim 12, wherein the $TiO_2$ pigment is in substantially rutile form.

15. The process of claim 12, wherein the aluminum compound is an aluminum halide selected from the group consisting of $AlCl_3$, $AlBr_3$, $AlI_3$, and mixtures thereof.

16. The process of claim 15, wherein the aluminum compound is $AlCl_3$.

17. The process of claim 13, wherein the boron compound is a boron halide which is introduced into the conduit at the point where the scouring particles are introduced into the conduit.

18. The process of claim 17, wherein the boron halide is selected from the group consisting of $BCl_3$, $BBr_3$, $BI_3$, and mixtures thereof, and the scouring particles are selected from the group consisting of calcined $TiO_2$, NaCl, KCl, sand, and mixtures thereof.

19. The process of claim 18, wherein the boron halide is $BCl_3$ and the scouring particles are NaCl.

20. The process of claim 18, wherein the boron halide is $BCl_3$ and the scouring particles are calcined $TiO_2$.

21. The process of claim 13, wherein the boron compound is boric acid which is introduced into the conduit at the point where the scouring particles are introduced into the conduit.

22. The process of claim 12, wherein the cooled $TiO_2$ pigment comprising $B_2O_3$ is recovered and subjected to surface treatment comprising treating the pigment with a coating comprising silica.

23. The process of claim 12, wherein the cooled $TiO_2$ pigment comprising $B_2O_3$ is recovered and fluid-energy milled.

* * * * *